United States Patent
Herrig et al.

(10) Patent No.: US 9,759,068 B2
(45) Date of Patent: Sep. 12, 2017

(54) SYSTEM AND METHOD FOR CONTROLLING A WIND TURBINE BASED ON IDENTIFIED SURFACE CONDITIONS OF THE ROTOR BLADES

(71) Applicant: General Electric Company, Schenectady, NY (US)

(72) Inventors: Andreas Herrig, Rheine (DE); Saskia Gerarda Honhoff, Salzbergen (DE)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 13/779,829

(22) Filed: Feb. 28, 2013

(65) Prior Publication Data

US 2014/0241878 A1 Aug. 28, 2014

(51) Int. Cl.
*F01D 5/12* (2006.01)
*F03D 7/02* (2006.01)
(Continued)

(52) U.S. Cl.
CPC ............... *F01D 5/12* (2013.01); *F03D 7/00* (2013.01); *F03D 7/0224* (2013.01); *F03D 17/00* (2016.05);
(Continued)

(58) Field of Classification Search
CPC ........ F03D 7/022; F03D 7/024; F03D 7/0252; F03D 7/0224; F03D 7/042; F03D 7/00; F03D 7/0296; F03D 7/0228; F03D 11/0091; F03D 1/0675; F03D 1/0633; F03D 1/0683; F03D 1/0641; Y02E 10/723; Y02E 10/722; Y02E 10/721; Y02T 50/672; Y02T 50/67; Y02T 50/673; Y02T 50/166; F01D 5/12; F05B 2270/30; F05B 2240/30; F05B 29/49318
(Continued)

(56) References Cited

U.S. PATENT DOCUMENTS 398,984 A * 3/1889 Fischer .................... B64B 1/00
244/151 R
4,298,313 A * 11/1981 Hohenemser ......... F03D 7/0212
416/10
(Continued)

FOREIGN PATENT DOCUMENTS

DK WO 2006090215 A1 * 8/2006 ........... F03D 1/0641
EP 1 828 599 B1 3/2011

OTHER PUBLICATIONS

U.S. Appl. No. 13/779,829—Lu et al—2009—Review of Recent Advances in Wind Turbine Condition Monitoring and Fault Diagnosis.*
(Continued)

*Primary Examiner* — Theodore Stigell
*Assistant Examiner* — Jon Hoffmann
(74) *Attorney, Agent, or Firm* — Dority & Manning, P.A.

(57) ABSTRACT

In one aspect, a method for controlling a wind turbine based on an identified surface condition of a rotor blade may include monitoring an operating parameter of the wind turbine to obtain parameter data related to the operating parameter as an operating input of the wind turbine changes, analyzing the parameter data to identify a roughness state of the rotor blade and performing a corrective action in response to the identified roughness state.

18 Claims, 8 Drawing Sheets

(51) Int. Cl.
*F03D 7/00* (2006.01)
*F03D 17/00* (2016.01)

(52) U.S. Cl.
CPC ......... *F05B 2270/30* (2013.01); *Y02E 10/723* (2013.01)

(58) Field of Classification Search
USPC ...................................................... 416/1, 23
See application file for complete search history.

(56) References Cited

U.S. PATENT DOCUMENTS

| | | | | |
|---|---|---|---|---|
| 5,570,859 | A * | 11/1996 | Quandt ..................... | B64C 9/18 244/113 |
| 6,295,006 | B1 * | 9/2001 | Kohlhepp ............. | B64C 27/001 244/17.11 |
| 6,419,187 | B1 * | 7/2002 | Buter ....................... | B64C 3/44 244/34 R |
| 7,086,834 | B2 | 8/2006 | LeMieux | |
| 7,445,431 | B2 * | 11/2008 | Larsen .................... | F03D 7/022 416/1 |
| 7,632,068 | B2 * | 12/2009 | Bak ....................... | F03D 1/0641 416/132 B |
| 8,147,209 | B2 * | 4/2012 | Godsk ................... | F03D 1/0641 416/241 R |
| 8,814,525 | B2 * | 8/2014 | Petsche ................. | F03D 1/0641 416/223 R |
| 2003/0091436 | A1 * | 5/2003 | Stiesdal ................ | F03D 1/0641 416/1 |
| 2004/0067134 | A1 * | 4/2004 | Beauchamp ............ | F03D 7/022 416/37 |
| 2004/0075278 | A1 * | 4/2004 | Canini ................... | F03D 9/002 290/44 |
| 2006/0140764 | A1 * | 6/2006 | Smith ................... | F03D 7/0224 416/103 |
| 2009/0169378 | A1 * | 7/2009 | Menke ................... | F03D 7/0224 416/1 |
| 2009/0202354 | A1 * | 8/2009 | Godsk ................... | F03D 1/0641 416/223 R |
| 2011/0204635 | A1 * | 8/2011 | Miller ..................... | F03D 7/048 290/44 |
| 2011/0217167 | A1 * | 9/2011 | Hancock ............... | F03D 1/0675 416/23 |
| 2011/0223006 | A1 * | 9/2011 | Loh ....................... | F03D 7/0224 415/118 |
| 2011/0246094 | A1 * | 10/2011 | Olesen ................ | F03D 11/0025 702/34 |
| 2011/0262281 | A1 * | 10/2011 | Petsche ................. | F03D 1/0641 416/223 R |
| 2011/0301915 | A1 * | 12/2011 | Lobato ................... | G01B 21/04 702/167 |
| 2012/0211986 | A1 * | 8/2012 | Bertolotti ................ | F03D 7/042 290/44 |
| 2012/0301296 | A1 * | 11/2012 | Greenblatt ................ | F03D 7/06 416/1 |

OTHER PUBLICATIONS

U.S. Appl. No. 13/779,829—Jasinski et al—1997—wind turbine performance under icing conditions.*
U.S. Appl. No. 13/779,829—Hansen et al—1993—aerodynamic of horizontal-axis wind turbines.*
U.S. Appl. No. 13/779,829—Chapter 5—Effects of Surface roughness on performance fo Wind turbines.*
Related U.S. Appl. No. 13/188,698, filed Jul. 22, 2011.

* cited by examiner

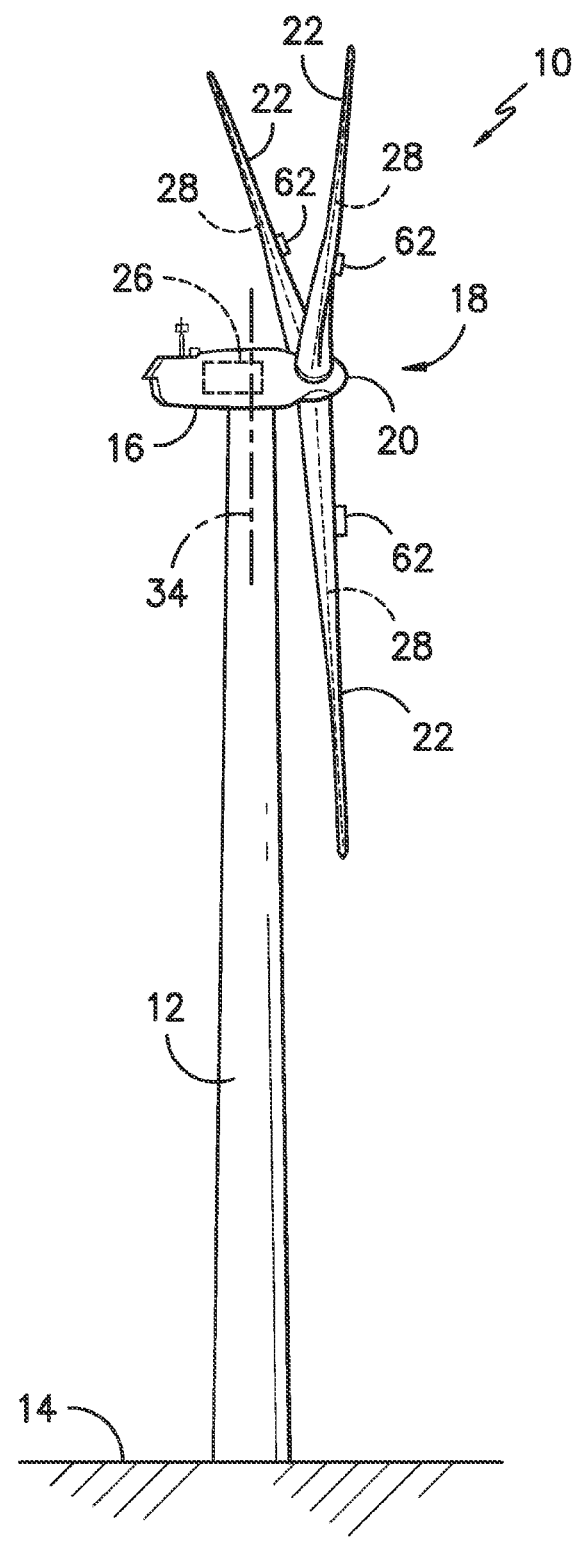
FIG. —1—

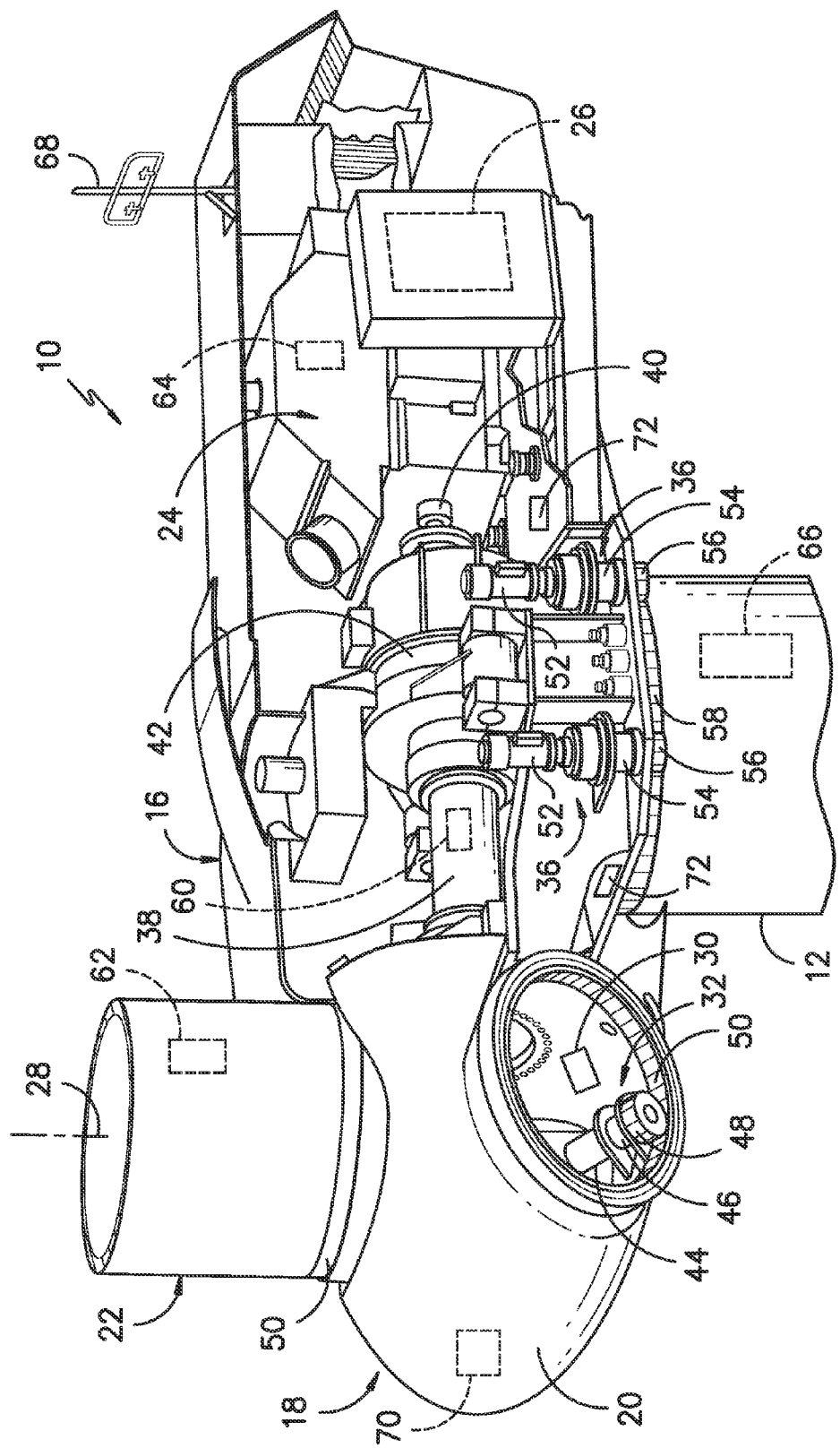
FIG. -2-

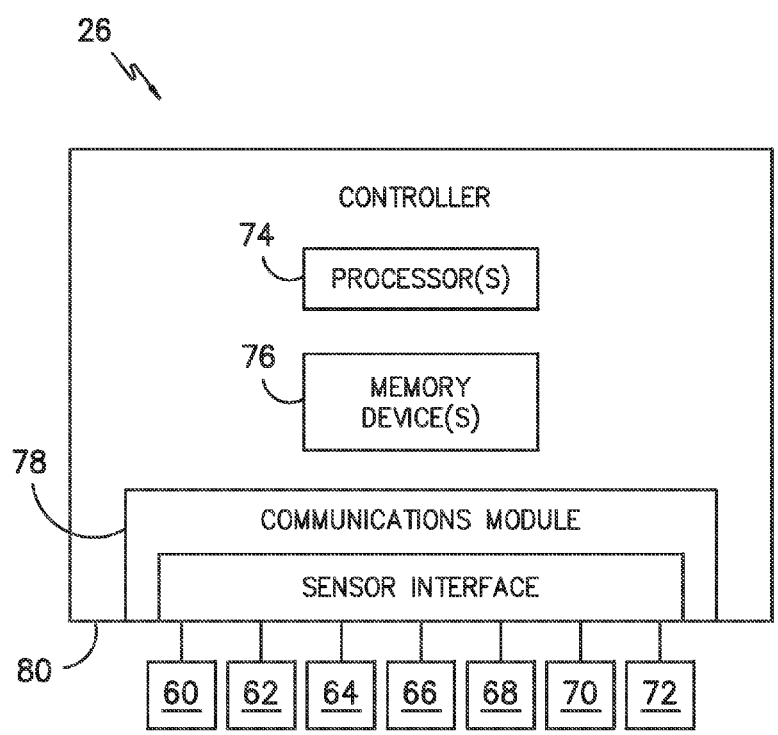
FIG. -3-

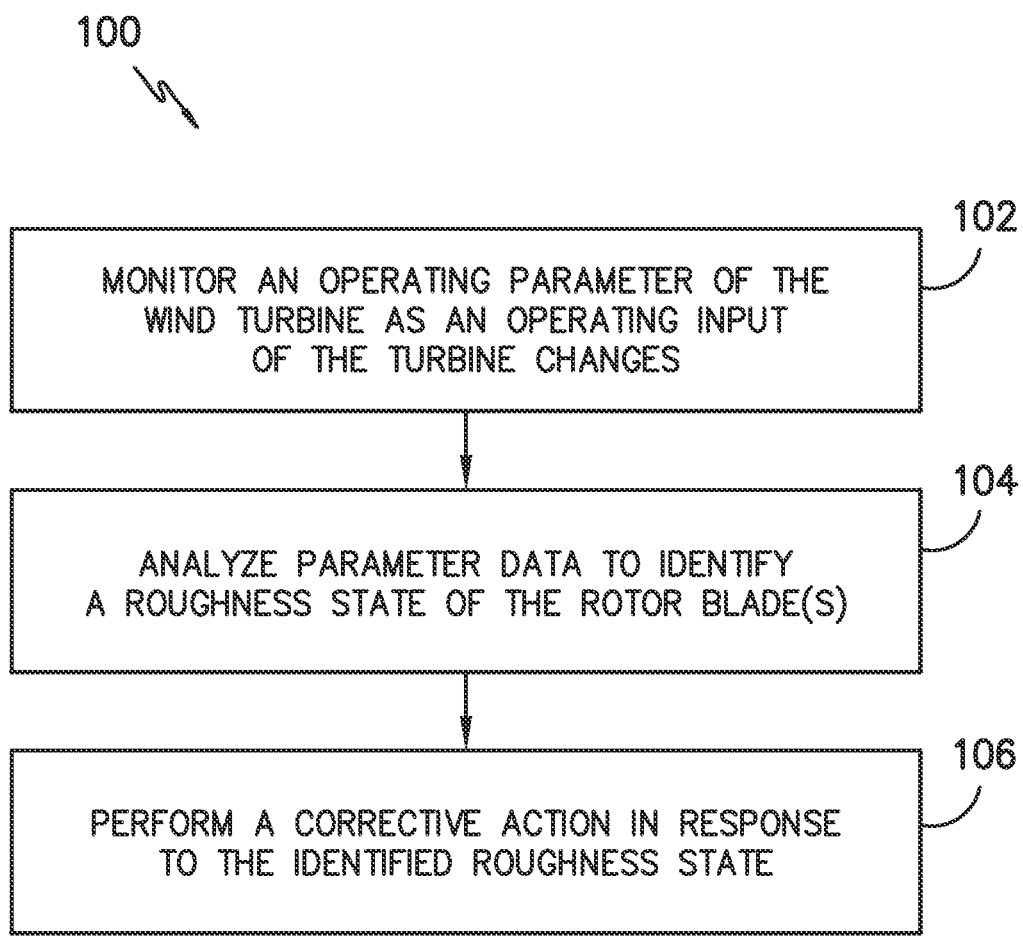
FIG. -4-

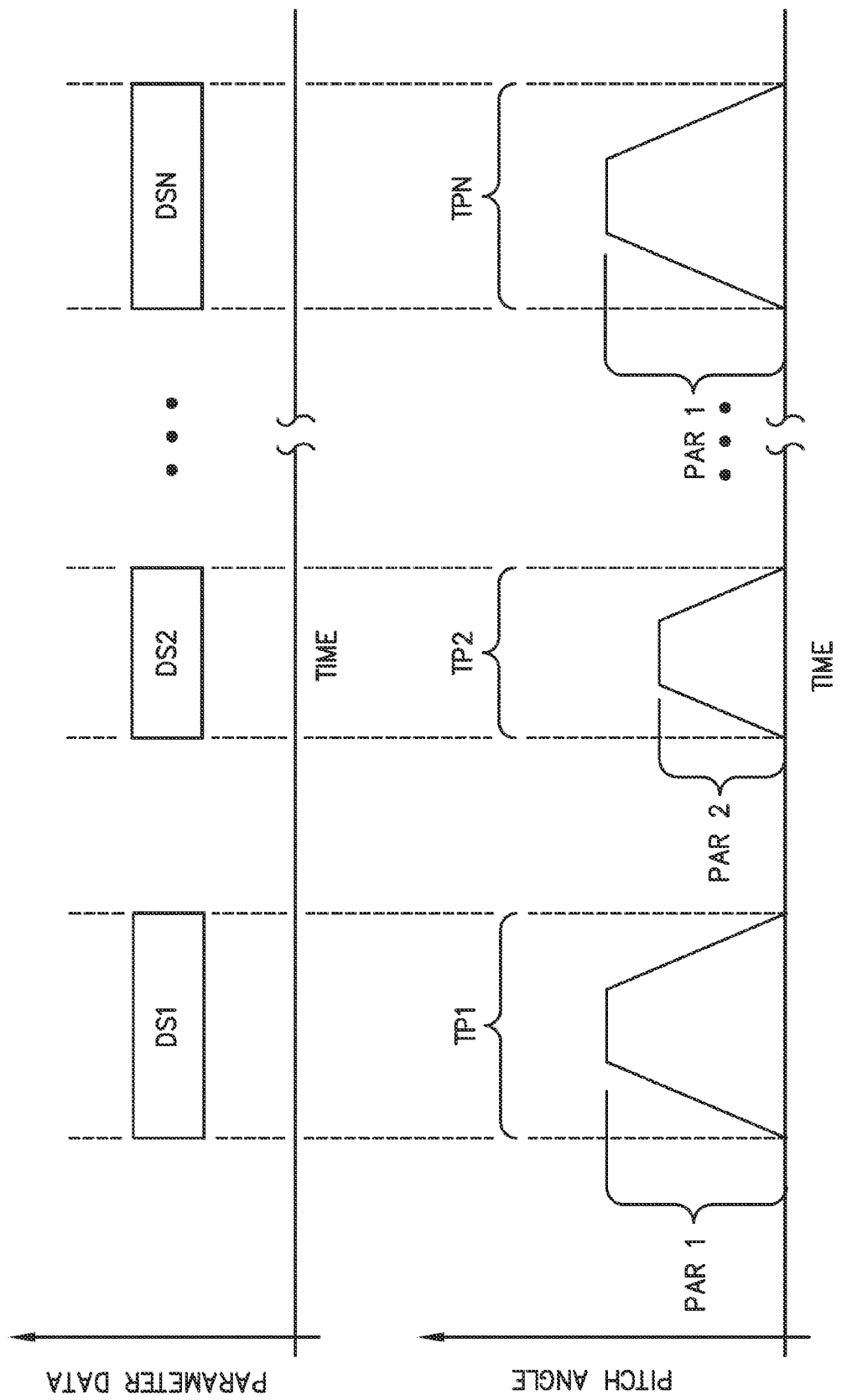
FIG. -5-

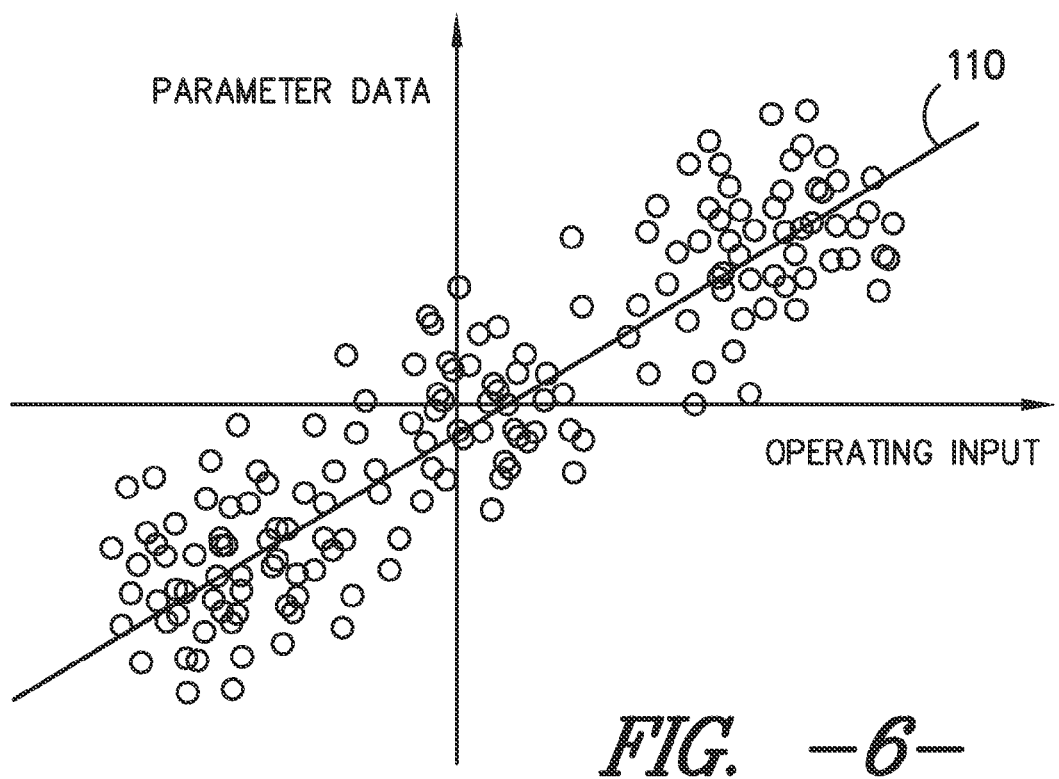
FIG. -6-
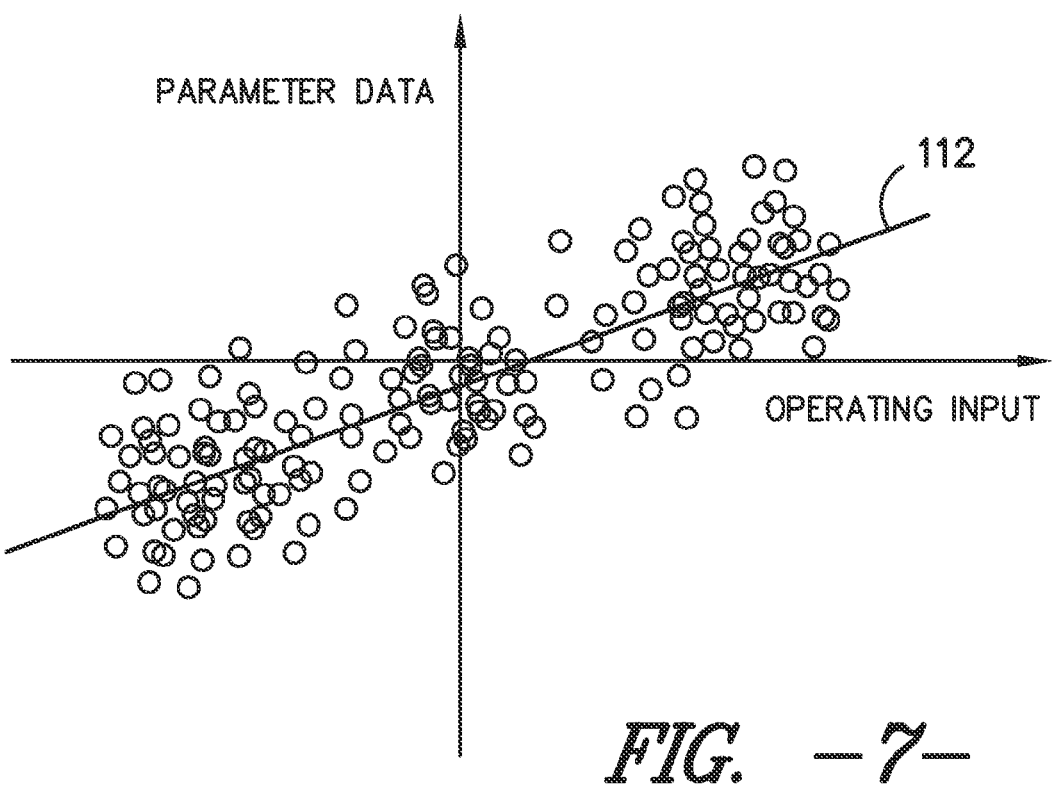
FIG. -7-

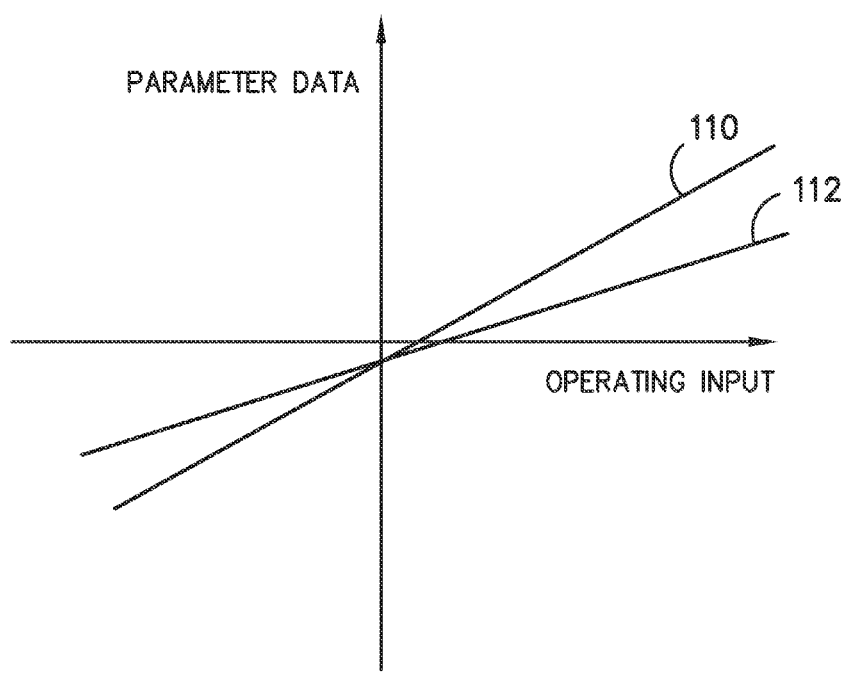
FIG. -8-

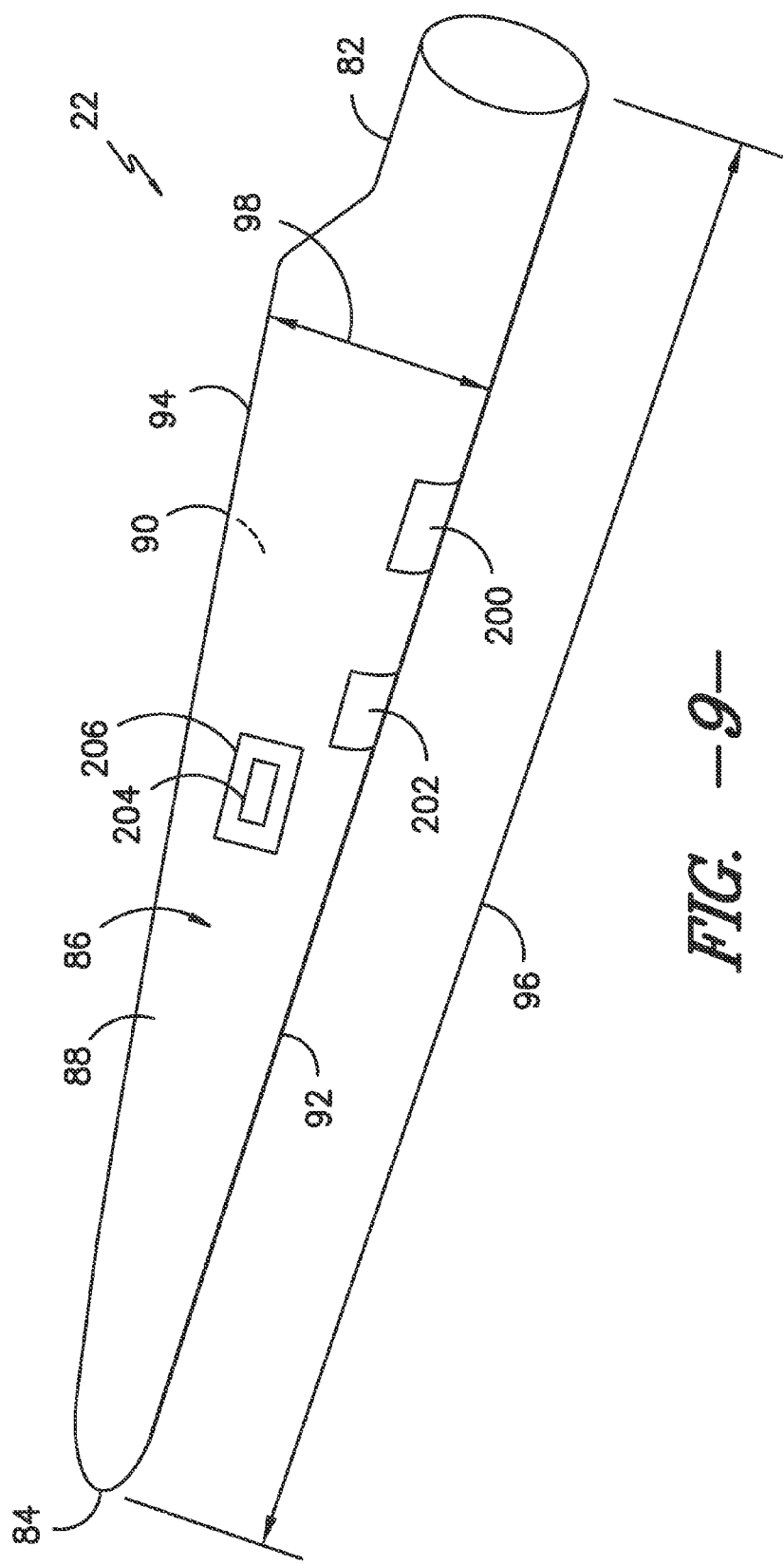

SYSTEM AND METHOD FOR CONTROLLING A WIND TURBINE BASED ON IDENTIFIED SURFACE CONDITIONS OF THE ROTOR BLADES

FIELD OF THE INVENTION

The present subject matter relates generally to wind turbines and, more particularly, to a system and method for controlling a wind turbine based on identified surface conditions of the rotor blades.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

During operation of a wind turbine, the outer surface of the rotor blades often becomes fouled or roughened over time. For example, dust, pollen, insects, and/or other debris may often collect along the other surface of a rotor blade, particularly adjacent to the leading edge of the rotor blade. In addition, various deposits may often form along the outer surface of a rotor blade, such as salt crystals, ice and/or like, thereby having a roughening effect on the rotor blades. Moreover, surface roughness of the rotor blades may also be caused due to erosion (e.g., sand erosion) and other blade damage (e.g., damage caused by avian impacts), as well as due to manufacturing defects.

When rotor blades become aerodynamically rough due to fouling and/or other factors, the amount of power generated by the wind turbine (and, thus, its Annual Energy Production (AEP)) is decreased significantly. This is mainly due to the reduced blade performance (e.g., reduced lift characteristics, increased drag, earlier stall, etc.) that results when increased surface roughness causes the transition point of laminar flow to turbulent flow across the rotor blade to move upstream towards the leading edge, which further results in increased wall shear and boundary layer thickness. In addition to such reduction in performance, increased surface roughness may also result in a significant increase in the amount of noise generated by the rotor blades.

Accordingly, a system and method for controlling a wind turbine in response to identified blade surface conditions (e.g., increased surface roughness) that allows for a wind turbine's AEP to be increased and/or the amount of noise generated by the rotor blades to be reduced despite the presence of aerodynamically rough blades surfaces would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a wind turbine based on an identified surface condition of a rotor blade of the wind turbine. The method may generally include monitoring an operating parameter of the wind turbine to obtain parameter data related to the operating parameter as an operating input of the wind turbine changes, analyzing the parameter data to identify a roughness state of the rotor blade and performing a corrective action in response to the identified roughness state.

In another aspect, the present subject matter is directed to a method for identifying a surface condition of a rotor blade of a wind turbine. The method may generally include adjusting an operating input of the wind turbine, monitoring an operating parameter of the wind turbine to obtain parameter data related to the operating parameter as the operating input is adjusted and analyzing the parameter data to identify a roughness state of the rotor blade.

In a further aspect, the present subject matter is directed to a system for controlling a wind turbine based on an identified surface condition of a rotor blade of the wind turbine. The system may generally include a sensor configured to monitor an operating parameter of the wind turbine as an operating input of the wind turbine changes and a controller communicatively coupled to the sensor so as to obtain parameter data related to the operating parameter. The controller may be configured to analyze the parameter data to identify a roughness state of the rotor blade. In addition, the controller may be configured to perform a corrective action in response to the identified roughness state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a simplified, internal view of one embodiment of a nacelle of a wind turbine;

FIG. 3 illustrates a schematic diagram of one embodiment of suitable components that may be included within a controller of a wind turbine;

FIG. 4 illustrates a flow diagram of one embodiment of a method for controlling a wind turbine in response to identified surface conditions of the rotor blades in accordance with aspects of the present subject matter;

FIG. 5 provides a graphical representation of one example of how parameter data may be obtained for an operating parameter of a wind turbine as an operating input of the wind turbine changes;

FIG. 6 provides a graphical representation of an example data compilation for a plurality of data sets mapping the dynamic response of a particular operating parameter to changes in a specific operating input for aerodynamically clean rotor blades;

FIG. 7 provides a graphical representation of an example data compilation for a plurality of data sets mapping the dynamic response of a particular operating parameter to changes in a specific operating input for aerodynamically rough rotor blades;

FIG. 8 provides a graphical representation of the average trend lines for the example data compilations shown in FIGS. 6 and 7; and FIG. 9 illustrates a perspective view of a rotor blade having various embodiments of surface roughness sensors installed thereon.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a wind turbine in response to identified surface conditions of the rotor blades. Specifically, in several embodiments, the present subject matter is directed to a method for indirectly detecting a roughness state of the rotor blades and, based on such roughness state, controlling the wind turbine to accommodate any surface roughness of the rotor blades. For example, various sensors may be used to monitor one or more operating parameters of the wind turbine (e.g., shaft bending, blade bending, tower bending, power, generator speed, generator torque, tower/hub/blade vibration, blade noise and/or the like) as one or more operating inputs of the wind turbine (e.g., pitch angle, yaw angle, generator speed, generator torque, wind conditions, such as wind speed and/or wind condition) are actively adjusted or otherwise change. As such, the dynamic response of the operating parameters to changes in the operating inputs may be monitored to allow for a significant amount of parameter data to be obtained for each operating parameter(s)/operating input(s) combination. For example, parameter data for a particular parameter(s)/input(s) combination may be initially obtained when it is known or anticipated that the rotor blades are aerodynamically clean, which may allow such clean parameter data to be used as a baseline for analyzing subsequently obtained data. Specifically, when additional parameter data for the particular parameter(s)/input(s) combination is obtained, it may be compared to the clean parameter data. If the new parameter data differs from the clean parameter data by a significant amount (e.g., beyond a suitable threshold), it may be assumed or determined that the blades have transitioned from an aerodynamically clean state to an aerodynamically rough state due to blade fouling, erosion, damage, etc. In such instance, a suitable corrective action may be performed (e.g., by pitching the rotor blades and/or modifying the operation of the generator) to optimize the wind turbine operation for the current roughness state of the rotor blades, thereby allowing the overall performance of the wind turbine to be enhanced.

It should be appreciated that, as used herein, the term "aerodynamically clean" may refer to a surface condition for a rotor blade in which no surface roughness exists (i.e., an aerodynamically smooth blade) and/or to a surface condition in which, although some surface roughness exists on the rotor blade, it is not sufficient to have a significant impact on blade's performance (e.g., in instances in which only a small portion of the blade's surface is rough and/or when the surface variations across the blade's surface are less than a given amount, such as less than 0.5 millimeter). Similarly, the term "aerodynamically rough" may refer to a surface condition for a rotor blade in which the surface roughness on the blade is sufficient to have a significant impact on the blade's performance and, thus, the surface of the rotor blade can no longer be considered aerodynamically clean.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the controller 26 may comprise a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. As such, the controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. Specifically, in several embodiments, the controller 26 may control the pitch angle of the rotor blades 22, either individually or simultaneously, by transmitting suitable control signals directly or indirectly (e.g., via a pitch controller 30 (FIG. 2)) to one or more pitch adjustment mechanisms 32 (FIG. 2) of the wind turbine 10. Similarly, the controller 26 may be configured to adjust the yaw angle of the nacelle 16 (i.e., an angle that determines a perspective of the nacelle 16 relative to the direction of the wind) about a yaw axis 34 of the wind turbine 10. For example, the controller 26 may transmit suitable control signals to one or more yaw drive mechanisms 36 (FIG. 2) of the wind turbine 10 to automatically control the yaw angle.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine (e.g., when the controller 26 is configured as a farm controller for controlling a plurality of wind turbines). As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 44 (e.g., any suitable electric motor), a pitch drive gearbox 46, and a pitch drive pinion 48. In such embodiments, the pitch drive motor 44 may be coupled to the pitch drive gearbox 46 so that the pitch drive motor 44 imparts mechanical force to the pitch drive gearbox 46. Similarly, the pitch drive gearbox 46 may be coupled to the pitch drive pinion 48 for rotation therewith. The pitch drive pinion 48 may, in turn, be in rotational engagement with a pitch bearing 50 coupled between the hub 20 and a corresponding rotor blade 22 such that rotation of the pitch drive pinion 48 causes rotation of the pitch bearing 50. Thus, in such embodiments, rotation of the pitch drive motor 44 drives the pitch drive gearbox 46 and the pitch drive pinion 48, thereby rotating the pitch bearing 50 and the rotor blade 22 about the pitch axis 28.

In alternative embodiments, it should be appreciated that each pitch adjustment mechanism 32 may have any other suitable configuration that facilitates rotation of a rotor blade 22 about its pitch axis 28. For instance, pitch adjustment mechanisms 32 are known that include a hydraulic or pneumatic driven device (e.g., a hydraulic or pneumatic cylinder) configured to transmit rotational energy to the pitch bearing 50, thereby causing the rotor blade 22 to rotate about its pitch axis 28. Thus, in several embodiments, instead of the electric pitch drive motor 44 described above, each pitch adjustment mechanism 32 may include a hydraulic or pneumatic driven device that utilizes fluid pressure to apply torque to the pitch bearing 50.

The wind turbine 10 may also include one or more yaw drive mechanisms 36 for adjusting the yaw angle of the nacelle 16. In several embodiments, similar to the pitch adjustment mechanisms 32, each yaw drive mechanism 36 may include a yaw drive motor 52 (e.g., any suitable electric motor), a yaw drive gearbox 54, and a yaw drive pinion 56 coupled together for simultaneous rotation. However, in other embodiments, each yaw drive mechanism 36 may have any other suitable configuration, such as by being hydraulic or pneumatic driven. Regardless, the yaw drive mechanism(s) 36 may be configured to adjust the yaw angle by rotationally engaging the yaw drive pinion 56 with a suitable yaw bearing 58 (also referred to as a slewring or tower ring gear) of the wind turbine 10, thereby allowing the nacelle 16 to be rotated about the yaw axis 34 (FIG. 1) relative to the wind.

It should be appreciated that, by controlling the various components of the wind turbine 10, the controller 26 may be configured to automatically adjust the operation of the wind turbine 10. For example, as indicated above, the controller 26 may be configured to transmit suitable control signals to the pitch adjustment mechanisms 32 (via the pitch controller 30) to automatically adjust the pitch angle of the rotor blades 22. Similarly, the controller 26 may be configured to transmit suitable control signals to the yaw drive mechanism(s) 36 to allow for the yaw angle of the nacelle 16 to be automatically adjusted. In addition, the controller 26 may be communicatively coupled to various other wind turbine components in order to control different aspects of the wind turbine operation. For example, the controller 26 may be communicatively coupled to the generator 24 to allow for the automatic adjustment of the generator torque, generator speed and/or any other suitable operational aspects of the generator 24.

In addition, the wind turbine 10 may also include one or more sensors for monitoring various operating parameters of the wind turbine 10. For example, in several embodiments, the wind turbine 10 may include one or more shaft sensors 60 configured to monitor one or more shaft-related operating parameters of the wind turbine 10, such as the loads acting on the rotor shaft 38 (e.g., thrust, bending and/or torque loads), the deflection of the rotor shaft 38 (e.g., including shaft bending), the rotational speed of the rotor shaft 38 and/or the like. Thus, suitable shaft sensors 60 may include, for instance, one or more load sensors (e.g., strain gauges, pressure sensors), optical sensors (e.g., proximity sensors, laser sensors, fiber optic sensors, cameras, LIDAR sensors), radar sensors, accelerometers, magnetic sensors, speed sensors, Micro-Inertial Measurement Units (MIMUs) and/or the like.

The wind turbine 10 may also include one or more blades sensors 62 (FIGS. 1 and 2) configured to monitor one or more blade-related operating parameters of the wind turbine 10, such as the loads acting on the blades 22 (e.g., bending loads), the deflection of the blades 22 (e.g., including blade bending, twisting and/or the like), the vibration of the blades 22, the noise generated by the blades 22, the pitch angle of the blades 22, the rotational speed of the blades 22 and/or the like. Thus, suitable blade sensors 62 may include, for example, one or more load sensors (e.g., strain gauges, pressure sensors), optical sensors (e.g., proximity sensors, laser sensors, fiber optic sensors, cameras and LIDAR sensors), radar sensors, accelerometers, magnetic sensors, speed sensors, angle of attack sensors, vibration sensors, noise sensors (e.g., microphones), Micro-Inertial Measurement Units (MIMUs) and/or the like. As will be described below with reference to FIG. 9, the rotor blades 22 may also include one or more roughness sensors 200, 202, 204 configured to directly monitor the surface roughness of the blades 22.

In addition, the wind turbine 10 may include one or more generator sensors 64 configured to monitor one or more generator-related operating parameters of the wind turbine 10, such as the power output of the generator 24, the rotational speed of the generator 24, the generator torque and/or the like. Thus, suitable generator sensors 64 may include, for instance, power sensors (e.g., voltage sensors, current sensors), torque sensors, speed sensors and/or the like.

Moreover, the wind turbine 10 may also include various other sensors for monitoring numerous other turbine operating parameters. For example, as shown in FIG. 2, the wind turbine 10 may include one or more tower sensors 66 (e.g., a load sensor(s), such as a strain gauge(s), accelerometer(s), MIMU(s), etc.) for monitoring various tower-related operating parameters, such as the loads acting the tower 12, the deflection of the tower 12 (e.g., tower bending and/or twisting), tower vibrations and/or the like. In addition, the wind turbine 10 may include one or more wind sensors 68 (e.g., an anemometer(s)) for monitoring one or more wind conditions of the wind turbine 10, such as the wind speed and/or the wind direction. Similarly, the wind turbine 10 may include one or more hub sensors 70 (e.g., a load sensor(s), accelerometer(s), etc.) for monitoring various hub-related operating parameters (e.g., the loads transmitted through the hub 20, hub vibrations and/or the like) and/or one or more nacelle sensors 72 (e.g., a load sensor(s), accelerometer(s), etc.) for monitoring one or more nacelle-related operating parameters (e.g., the loads transmitted through the nacelle 16, nacelle vibrations and/or the like). Of course, the wind turbine 10 may further include various other suitable sensors for monitoring any other suitable operating parameters of the wind turbine 10. It should be appreciated that the various sensors described herein may correspond to pre-existing sensors of a wind turbine 10 and/or sensors that have been specifically installed within the wind turbine 10 to allow one or more operating parameters to be monitored.

It should also be appreciated that, as used herein, the term "monitor" and variations thereof indicates that the various sensors of the wind turbine 10 may be configured to provide a direct measurement of the operating parameters being monitored or an indirect measurement of such operating parameters. Thus, the sensors may, for example, be used to generate signals relating to the operating parameter being monitored, which can then be utilized by the controller 26 to determine the actual operating parameter.

Referring now to FIG. 3, there is illustrated a block diagram of one embodiment of suitable components that may be included within the turbine controller 26 (and/or the pitch controller 30) in accordance with aspects of the present subject matter. As shown, the controller 26 may include one or more processor(s) 74 and associated memory device(s) 76 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 76 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 76 may generally be configured to store suitable computer-readable instructions that, when implemented by the processor(s) 74, configure the controller 26 to perform various functions including, but not limited to, monitoring one or more operating parameters of the wind turbine 10 based on signals received from the sensors 60, 62, 64, 66, 68, 70, 72, transmitting suitable control signals to implement corrective actions in response to the identification of aerodynamically rough rotor blades 22 and various other suitable computer-implemented functions.

Additionally, the controller 26 may also include a communications module 78 to facilitate communications between the controller 26 and the various components of the wind turbine 10. For instance, the communications module 78 may serve as an interface to permit the turbine controller 26 to transmit control signals to each pitch adjustment mechanism 32 for controlling the pitch angle of the rotor blades 22. Moreover, the communications module 78 may include a sensor interface 80 (e.g., one or more analog-to-digital converters) to permit signals transmitted from the sensors 60, 62, 64, 66, 68, 70, 72 to be converted into signals that can be understood and processed by the processors 58.

It should be appreciated that the sensors 60, 62, 64, 66, 68, 70, 72 may be communicatively coupled to the communications module 78 using any suitable means. For example, as shown in FIG. 3, the sensors 60, 62, 64, 66, 68, 70, 72 are coupled to the sensor interface 80 via a wired connection. However, in other embodiments, the sensors 60, 62, 64, 66, 68, 70, 72 may be coupled to the sensor interface 64 via a wireless connection, such as by using any suitable wireless communications protocol known in the art.

Referring now to FIG. 4, a flow diagram of one embodiment of a method 100 for controlling a wind turbine 10 based on an identified surface condition of a rotor blade 22 is illustrated in accordance with aspects of the present subject matter. In general, the method 100 may allow for the surface roughness of the rotor blades 22 to be indirectly detected by monitoring one or more operating parameters of the wind turbine (e.g., shaft deflection, blade deflection, tower deflection, power output, generator speed, generator torque, blade/hub/tower vibration, blade noise, derivatives of any operating parameters, such as generator speed and/or torque derivatives, and/or the like). The identified surface roughness may then be used as a basis for performing corrective actions to modify the wind turbine operation in order to accommodate the current roughness state of the rotor blades 22. For example, as the surface of the blades become aerodynamically rough due to fouling, erosion, damage, etc., various aerodynamic properties of the rotor blades 22, such as the lift coefficient, drag coefficient, lift-to-drag ratio, stall angle, etc., are impacted, which may, in turn, cause variations in the operating parameters of the wind turbine 10. Thus, by monitoring one or more wind turbine operating parameters, the surface roughness or lack thereof may be detected by identifying certain changes in the operating parameters. Upon the detection of a given amount of surface roughness, the wind turbine operation may be modified (e.g., by adjusting the pitch angle and/or the tip speed ratio of the rotor blades) to reduce the impact of such roughness on the overall turbine performance.

As shown in FIG. 4, at 102, one or more operating parameters of the wind turbine 10 may be monitored as one or more operating inputs of the turbine change, thereby allowing parameter data to be obtained corresponding to the dynamic response of the operating parameter(s) to changes in the operating input(s). As used herein, the term "operating input" refers to any suitable operational variable of a wind turbine 10 that, when varied, results in a change in one or more of the operating parameters of the wind turbine 10. For example, operating inputs may include, but are not limited to, inputs that may be actively or automatically controlled, such as the pitch angle of the rotor blades 22, the yaw angle of the nacelle 16, the rotational speed of one or more components of the wind turbine 10 (e.g., rotor speed or generator speed), generator torque and/or the like, and various other operating inputs, such as wind conditions (e.g., wind speed and/or wind direction).

In several embodiments, one or more of the operating inputs may be actively adjusted (e.g., by actively pitching the rotor blades 22, yawing the nacelle 16, and/or controlling the operational speed and/or torque of the generator 24) while one or more operating parameters are being monitored using the various sensors 60, 62, 64, 66, 68, 70, 72 described above to allow parameter data related to the operating parameter(s) to be obtained. Alternatively, for passive operating inputs (e.g., wind speed and/or wind direction), the operating parameter(s) may simply be monitored while such input(s) are changing to obtain parameter data related to the operating parameter(s). Regardless, the parameter data obtained from the sensors 60, 62, 64, 66, 68, 70, 72 may then be transmitted to the controller 26 for subsequent analysis and/or storage. It should be appreciated that, in several embodiments, the parameter data may be obtained while the wind turbine 10 is operating.

FIG. 5 provides a graphical representation of one example of how parameter data may be obtained as one of the operating inputs of the wind turbine 10 is changed or otherwise changes (e.g., in this instance, the pitch angle of the rotor blades 22). As shown, the rotor blades 22 may be periodically pitched across one or more pitch angle ranges PAR1, PAR2 (e.g., by pitching the blades 22 away from the power position by a given angle, such as 5-15 degrees, holding the blades 22 at such angle for a given period of time and then pitching the blades 22 back to the power position) while one or more operating parameters are being monitored. Such periodic pitching of the rotor blades 22 may allow for multiple parameter data sets (e.g., a $1^{st}$ data set (DS1), a $2^{nd}$ data set (DS2), . . . and an $N^{th}$ data set, wherein N is the total number of data sets obtained) to be obtained over a plurality of separate time periods (e.g., TP1, TP2, TPN). For instance, the blades 22 may be pitched every minute, hourly, daily, weekly, monthly and/or at any other suitable interval to allow a plurality of different data sets to be obtained for each monitored operating parameter. Moreover, as shown in FIG. 5, by pitching the rotor blades 22 across two or more different pitch angle ranges PAR1, PAR2, the data sets may be representative of the different responses of the operating parameter(s) to varying magnitudes of changes in the pitch angle.

It should be appreciated that parameter data may be similarly obtained as changes are occurring in any other suitable operating input(s). For example, the yaw angle of the nacelle 16 may be periodically adjusted across a range of yaw angles while one or more of the operating parameters are being monitored. Similarly, the generator speed and/or torque may be periodically adjusted across a range of speeds/torques to allow for parameter data to be obtained for one or more of the operating parameters. In addition, for changes in the wind speed and/or the wind direction, the operating parameter(s) may be monitored as the wind speed and/or direction changes to allow parameter data to be obtained.

The parameter data acquired may then be organized and stored within the controller 26 and/or any other suitable data storage device. In several embodiments, the data sets obtained for a particular operating parameter in response to changes in a specific operating input may be organized into a data compilation based on the observed, anticipated and/or known roughness state of the rotor blades 22. Specifically, there may be instances in which it is known or anticipated that the rotor blades 22 are aerodynamically clean. For example, it may be assumed that the rotor blades 22 are aerodynamically clean when the blades 22 are new (or are relatively new) or after the blades have been cleaned (e.g., after a rain storm or after the blades have been washed as part of a maintenance operation). Parameter data obtained during these instances may be identified as "clean parameter data" and may be stored within the controller 26 (or other storage device) accordingly. As will be described below, this clean parameter data may then be used as baseline or reference data for detecting changes in the surface roughness of the rotor blades.

For example, FIG. 6 provides a graphical representation of an example data compilation for a plurality of data sets (e.g., DS1, DS2 . . . DSN) mapping the dynamic response of a particular operating parameter to changes in a specific operating input (e.g., pitch angle) while the rotor blades are aerodynamically clean. As shown, the clean parameter data obtained may be scattered due to sensor errors, variations in the magnitude of the input changes (e.g., PAR1 v. PAR2), variations in other operating parameters of the wind turbine 10 and/or due to any other suitable factors. Thus, in several embodiments, the parameter data may be analyzed to determine a best-fit or trend line 110 corresponding to the average response in the relevant operating parameter as a result of variations in the operating input. This trend line 100 for the clean parameter data may then, in several embodiments, serve as the basis for analyzing subsequently obtained parameter data to determine the roughness state of the rotor blades 22.

As indicated above, the parameter data for the operating parameter(s) may be periodically obtained over plurality of different time periods (e.g., TP1, TP2, TPN). Thus, in addition to obtaining clean parameter data, parameter data may also be obtained when the roughness state of the rotor blades 22 is unknown and, in particular, when the surfaces of the rotor blades 22 have been significantly roughened over time. For example, FIG. 7 provides a graphical representation of an example data compilation for a plurality of data sets (e.g., DS1, DS2 . . . DSN) mapping the dynamic response of a particular operating parameter to changes in a specific operating input (e.g., pitch angle) when the surfaces of rotor blades 22 are aerodynamically rough. As shown, similar to the clean parameter data, this "rough parameter data" may be scattered due to sensor errors, variations in the operating parameters and/or the like. Thus, the data may be analyzed to determine a best-fit or trend line 112 corresponding to the average response in the relevant operating parameter as a result of variations in the operating input.

It should be appreciated that, in one embodiment, the surface of the rotor blades 22 may be intentionally roughened to allow baseline or reference data to be obtained for aerodynamically rough rotor blades 22. For example, a roughness modifier (e.g., a turbulator strip) may be attached to the surface of the rotor blades 22 to allow reference data to be obtained for the blades 22.

It should also be appreciated that, for certain operating parameters, the measured parameter data may be dependent on the wind speed and/or the air density (e.g., the wind speed squared times the air density). Thus, for such operating parameters, the parameter data may be organized within the controller 26 based on the wind speed present at the time the data was collected. For example, the parameter data may be grouped or binned within specific bands of wind speeds (e.g., with each wind speed band having a width of about 0.5 m/s to about 1 m/s). In addition, the binned parameter data may also be corrected or normalized based on the actual air density present at the time the data was collected to allow the data to be comparable.

Referring back to FIG. 4, at 104, the parameter data obtained at 102 may be analyzed to identify a roughness state of the rotor blade. As indicated above, in several embodiments, the roughness state of the rotor blades 22 may be identified by comparing newly or recently obtained parameter data to a baseline set of pre-stored, clean parameter data. Thus, to provide an example, it may be assumed that the data compilation shown in FIG. 7 corresponds to the most recently obtained data set(s) for a particular operating parameter. In such an embodiment, the average trend line 112 established for such data may be compared to the average trend line 110 for the corresponding clean parameter data shown in FIG. 6. If the current parameter data differs from the clean parameter data by a specific threshold, it may then be determined that the surfaces of the rotor blades 22 are no longer clean and, thus, a significant amount of surface roughness must be present.

For example, FIG. 8 provides a graph illustrating the trend lines 110, 112 for the data sets described above with reference to FIGS. 6 and 7. As shown, the trend line 112 for the current or rough parameter data deviates from the trend line 110 for the clean parameter data. Specifically, in the illustrated embodiment, the trend lines 110, 112 exhibit significantly different slopes. In such an embodiment, a predetermined threshold may, for example, be established that corresponds to a specific slope differential at which the data indicates that significant surface roughness exists. Thus, if the slope of the current trend line 112 differs from the slope of the clean trend line 110 by at least the predetermined threshold, it may be determined that the surfaces of the rotor blades 22 are aerodynamically rough.

It should be appreciated that, in other embodiments, the predetermined threshold may be established using any other suitable data indicator that provides a means for distinguishing the clean parameter data from parameter data obtained when the surfaces of the rotor blades are aerodynamically rough. For example, as an alternative to using a specific slope differential, minimum and/or maximum offset values from the clean trend line 110 (e.g., one or more standard deviations) may be used as the predetermined threshold for analyzing the more recently obtained parameter data. Moreover, it should be appreciated that the parameter response embodied in the parameter data may be non-linear. In such an embodiment, each trend-line 110, 112 may, for example, correspond to a reference line extending tangent to a suitable curve-fit associated with the parameter data.

Referring back to FIG. 4, at 106, a corrective action may be performed in response to the identified roughness state of the rotor blades 22. Specifically, in several embodiments, a corrective action may be performed when it is determined that the surfaces of the rotor blades 22 are aerodynamically rough. For example, as indicated above, pre-stored, clean parameter data may be compared to the current parameter data to determine if the current parameter data differs from the clean parameter data by at least a predetermined threshold. If the current parameter data actually differs from the clean parameter data by at least the threshold, a suitable corrective action may then be performed to appropriately adjust the wind turbine operation. However, if the threshold is not exceeded, the wind turbine operation may be continued without the need to perform a corrective action.

In general, the corrective action performed in response to the identification of aerodynamically rough rotor blades may correspond to any suitable control action that allows for the performance of the rotor blades 22 and/or the wind turbine 10 to be enhanced despite the existence of such rough surface conditions. Specifically, it has been found that a percentage (e.g., about 0.5%-1.5%) of the AEP reduction caused by aerodynamically rough blades may be recovered by adapting the wind turbine operation to accommodate the current roughness state of the blades 22. For example, by modifying one or more of the operating inputs of the wind turbine 10 based on the identified surface roughness, the performance losses for the rotor blade 22 (e.g., reduce lift, increased drag, earlier stall) may be reduced, thereby resulting in an effective AEP gain for the wind turbine 10. Moreover, by adapting the wind turbine operation based on the surface condition of the rotor blades 22, the amount of noise generated by the rotor blades 22 may also be reduced.

In several embodiments, the corrective action performed may correspond to adjusting the pitch angle of the rotor blades 22 in order to accommodate the surface roughness of the rotor blades 22 (particularly at the leading edge of the rotor blades 22). As indicated above, the rotor blades 22 may be pitched by controlling the operation of the pitch adjustment mechanisms 32.

In another embodiment, the corrective action performed may be directed towards adjusting the tip speed ratio (TSR) of the rotor blades 22 (i.e., the ratio of blade tip speed to the wind speed). As is generally understood, the TSR may be adjusted using any suitable control action that allows for a modification of the rotor speed. For example, the control action may correspond to adjusting the operation of the generator 24 (e.g., by modifying the generator torque and/or the generator speed), which may, in turn, result in the rotor speed being modified. In another embodiment, the control action may correspond to yawing the nacelle 16 in order to change the yaw angle, thereby allowing the rotor speed to be modified. In a further embodiment, the TSR may be adjusted by modifying the pitch angle of the rotor blades 22 in the manner described above.

Additionally, various other corrective actions may be performed in response to the identification and/or detection of aerodynamically rough rotor blades 22. For example, in one embodiment, the controller 26 may be configured to provide an alert or other notification indicating the roughness state of the rotor blades 22. This notification may be designed to signal to maintenance workers that a suitable maintenance operation may need to be performed. For example, upon receipt of the notification, a blade cleaning/washing operation may be scheduled to allow for the removal of any blade fouling and/or other blade deposits. In another embodiment, for instance in which ice may be present on the rotor blades 22, the corrective action may be performing any suitable ice mitigation strategy (e.g., by activating heaters or any other suitable de-icing system associated with the rotor blades 22).

It should be appreciated that, in addition to the various sensors 60, 62, 64, 66, 68, 70, 72 described above, the wind turbine 10 may also include one or more surface roughness sensors configured to directly monitor the surface roughness of the rotor blades 22. For example, FIG. 9 illustrates a perspective view of a rotor blade 22 having various embodiments of roughness sensors 202, 204, 206 installed thereon. As shown, the rotor blade 22 includes a blade root 82 configured for mounting the rotor blade 22 to the hub 18 of a wind turbine 10 (FIG. 1), a blade tip 84 disposed opposite the blade root 82 and body 86 extending between the blade root 82 and blade tip 84. The body 86 may generally define the aerodynamic shape of the rotor blade 22 and, thus, may include a pressure side 88 and a suction side 90 extending between a leading edge 92 and a trailing edge 94. In addition, the rotor blade 22 may generally include a span 96 defining the total length between the blade root 82 and the blade tip 84 and a chord 98 defining the total length between the leading edge 92 and the trailing edge 94. As is generally understood, the chord 98 may vary in length with respect to the span 96 as the body 86 extends from the blade root 82 to the blade tip 84.

Additionally, as shown in FIG. 9, one or more roughness sensors 200, 202, 204 may be installed on and/or within the rotor blade 22. In general, the roughness sensors 200, 202, 204 may be configured to provide the controller 26 with surface condition data relating to the surface roughness of the rotor blade 22. For example, in one embodiment, the roughness sensor(s) may be a thin-film anemometer 200 positioned along the outer surface of the blade 22 (e.g., at or near the leading edge 92). The thin-film anemometer 200 may include, for example, a heated plate that is maintained at a constant temperature by varying the electrical current supplied to the plate. In such an embodiment, the surface roughness of the rotor blade 22 may be detected by monitoring the heat removal rate across the plate (i.e., by monitoring how much current is required to maintain the temperature of the plate constant). Typically, the heat removal rate from the plate will be much higher with a turbulent flow. Thus, when the heat removal rate increases, it may be assumed that the transition point from laminar flow to turbulent flow has shifted closer to the leading edge 92 of the rotor blade 22, thereby indicating the possibility of an aerodynamically rough rotor blade 22.

In another embodiment, the roughness sensor(s) may be a thin-film photo-voltaic (PV) sensor 202 positioned along the outer surface of the blade 22 (e.g., at or near the leading edge 92). As is generally understood, PV sensors 202 may be configured to convert the light hitting the sensors into an electrical current or any other suitable output. Thus, when the PV sensor 202 is clean, the sensor 202 may be exposed to a maximum amount of light. However, as the surface of the blade 22 (and, thus, the surface of the PV sensor 202) becomes roughened due to fouling and/or other depositions, the PV sensor's exposure to light will be reduced. As such, the output of the PV sensor 202 may be proportional to or may otherwise be indicative of the surface roughness of the rotor blade 22. Accordingly, by analyzing the sensor's output, the roughness state of the rotor blades 22 may be estimated or determined.

In a further embodiment, the roughness sensor(s) may be an optical sensor 204 positioned behind a transparent panel or window 206 forming a portion of the outer surface of the blade 22. For example, the optical sensor 204 may be a camera configured to capture images of the window 206. In such an embodiment, the images captured by the camera may be analyzed to detect any changes in the transparency of the window due to fouling or other surface contamination. By monitoring and/or analyzing such transparency changes, the roughness state of the rotor blades 22 may be estimated or determined.

It should be appreciated that, in others embodiments, the roughness sensor(s) 200, 202, 204 may be any other suitable sensor(s) that allow for the surface roughness of the rotor blades 22 to be directly monitored. For example, in one embodiment, the roughness sensor(s) may be a pressure sensor configured to monitor pressure variations along the surface of the rotor blade 22 occurring when the transition point from laminar flow to transition flow shifts across the location of the sensor towards the leading edge 92 of the blade 22, thereby indicating that the rotor blade 22 may be aerodynamically rough.

Using the disclosed roughness sensors 200, 202, 204, the surface roughness of the rotor blades 22 may be directly estimated. Alternatively, in accordance with the method 100 described above with reference to FIG. 4, the surface condition data provided by the roughness sensor(s) 200, 202, 204 may be used to supplement the parameter data being analyzed by the controller 26. For example, if analysis of the current parameter data indicates that the rotor blades 22 are aerodynamically rough, the surface condition data provided by the roughness sensor(s) 200, 202, 204 may be used to confirm the accuracy of this analysis. Thus, the surface condition data may be used to increase the statistical confidence in the estimation made using the parameter data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine based on an identified surface condition of a rotor blade of the wind turbine, the method comprising:

actively adjusting an operating input of the wind turbine over time;

monitoring an operating parameter of the wind turbine to obtain parameter data related to the operating parameter as the operating input is being actively adjusted;

comparing the parameter data to predetermined parameter data for the operating parameter to identify variations in a dynamic response of the operating parameter over time to changes in the operating input;

determining that a change in a surface roughness of the rotor blade has occurred based on the identified variations in the dynamic response of the operating parameter;

adjusting at least one of a pitch angle or a tip speed ratio of the rotor blade when it has been determined that the change in the surface roughness of the rotor blade exceeds a predetermined threshold account for the change in the surface roughness of the rotor blade; and maintaining the adjustment made to the at least one of the pitch angle or the tip speed ratio as the wind turbine continues to be operated so as to recover over time at least a portion of a reduction in an aerodynamic efficiency caused by the change in the surface roughness of the rotor blade.

2. The method of claim 1, wherein the operating input comprises at least one of pitch angle, yaw angle, generator speed or generator torque.

3. The method of claim 1, wherein the operating parameter comprises at least one of shaft bending, blade bending, tower bending, power output, generator speed, generator torque, component vibration or blade noise.

4. The method of claim 1, wherein the predetermined parameter data corresponds to clean parameter data previously collected for the operating parameter while the operating input was being actively adjusted.

5. The method of claim 4, wherein determining that the change in the surface roughness has occurred comprises determining that the change in the surface roughness has occurred when the dynamic response of the operating parameter as provided within the parameter data differs from the dynamic response of the operating parameter as provided within the clean parameter data by at least the predetermined threshold.

6. The method of claim 4, wherein determining that the change in the surface roughness has occurred comprises:
analyzing the parameter data to establish a current trend line for the parameter data;
analyzing the clean parameter data to establish a clean trend line for the clean parameter data; and
comparing the current trend line to the clean trend line to identify the variations in the dynamic response of the operating parameter over time to changes in the operating input.

7. The method of claim 1, wherein adjusting the at least one of the pitch angle or the tip speed ratio of the rotor blade comprises adjusting the tip speed ratio when it has been determined that the change in the surface roughness of the rotor blade exceeds the predetermined threshold.

8. The method of claim 1, further comprising supplementing the parameter data with surface condition data obtained using a surface roughness sensor in order to determine that the change in the surface roughness of the rotor blade has occurred.

9. A system for controlling a wind turbine based on an identified surface condition of a rotor blade of the wind turbine, the system comprising:
a controller including at least one processor and associated memory, the memory storing instructions that, when implemented by the at least one processor, configured the controller to:
actively adjust an operating input of the wind turbine over time;
monitor an operating parameter of the wind turbine to obtain parameter data related to the operating parameter as the operating input is being actively adjusted;
compare the parameter data to predetermined parameter data for the operating parameter to identify variations in a dynamic response of the operating parameter over time to changes in the operating input;
determine that a change in a surface roughness of the rotor blade has occurred based on the identified variations in the dynamic response of the operating parameter;
adjust at least one of a pitch angle or a tip speed ratio of the rotor blade when it has been determined that the change in the surface roughness of the rotor blade exceeds a predetermined threshold to account for the change in the surface roughness of the rotor blade; and
maintain the adjustment made to the at least one of the pitch angle or the tip speed ratio as the wind turbine continues to be operated so as to recover over time at least a portion of a reduction in an aerodynamic efficiency caused by the change in the surface roughness of the rotor blade.

10. The system of claim 9, wherein the operating input comprises at least one of pitch angle, yaw angle, generator speed or generator torque.

11. The system of claim 9, wherein the operating parameter comprises at least one of shaft bending, blade bending, tower bending, power output, generator speed, generator torque, component vibration or blade noise.

12. The system of claim 9, wherein the predetermined parameter data corresponds to clean parameter data previously collected for the operating parameter while the operating input was being actively adjusted.

13. The system of claim 12, wherein the controller is configured to determine that the change in surface roughness has occurred when the dynamic response of the operating parameter as provided within the parameter data differs from the dynamic response of the operating parameter as provided within the clean parameter data by at least the predetermined threshold.

14. The system of claim 9, wherein the controller is configured to adjust the tip speed ratio of the rotor blade when it has been determined that the change in the surface roughness of the rotor blade exceeds the predetermined threshold.

15. The system of claim 9, further comprising a surface roughness sensor configured to directly monitor the surface roughness of the rotor blade, the controller being communicatively coupled to the surface roughness sensor, the controller configured to supplement the parameter data with surface condition data obtained from surface roughness sensor in order to determine that the change in the surface roughness of the rotor blade has occurred.

16. The system of claim 12, wherein the controller is configured to determine that the change in surface roughness has occurred by comparing a current trend line associated with the parameter data to a clean trend line associated with the clean parameter data to identify the variations in the dynamic response of the operating parameter over time to changes in the operating input.

17. The system of claim 9, wherein the controller is configured to adjust the pitch angle of the rotor blade when it has been determined that the change in the surface roughness of the rotor blade exceeds the predetermined threshold.

18. The method of claim 1, wherein adjusting the at least one of the pitch angle or the tip speed ratio of the rotor blade comprises adjusting the pitch angle when it has been determined that the change in the surface roughness of the rotor blade exceeds the predetermined threshold.

* * * * *